United States Patent
Baker et al.

(10) Patent No.: US 11,432,096 B2
(45) Date of Patent: *Aug. 30, 2022

(54) HANDSFREE BEAM PATTERN CONFIGURATION

(71) Applicant: Apple Inc., Cupertino, CA (US)

(72) Inventors: John J. Baker, Cupertino, CA (US); Martin E. Johnson, Los Gatos, CA (US); Afrooz Family, Emerald Hills, CA (US); Michael B. Howes, Mountain View, CA (US); Craig M. Stanley, Campbell, CA (US); Brad G. Boozer, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 635 days.

This patent is subject to a terminal disclaimer.

(21) Appl. No.: 16/297,342

(22) Filed: Mar. 8, 2019

(65) Prior Publication Data
US 2019/0208347 A1  Jul. 4, 2019

Related U.S. Application Data

(63) Continuation of application No. 15/037,302, filed as application No. PCT/US2014/057547 on Sep. 25, 2014, now Pat. No. 10,251,008.

(Continued)

(51) Int. Cl.
*G10L 17/04* (2013.01)
*G10L 17/06* (2013.01)
(Continued)

(52) U.S. Cl.
CPC .............. *H04S 7/302* (2013.01); *G10L 17/04* (2013.01); *G10L 17/06* (2013.01); *H04R 1/08* (2013.01);
(Continued)

(58) Field of Classification Search
CPC ......... H04S 7/302; G10L 17/04; G10L 17/06; H04R 1/08; H04R 1/403; H04R 2203/12; H04R 430/23
See application file for complete search history.

(56) References Cited

U.S. PATENT DOCUMENTS 5,255,326 A   10/1993 Stevenson
5,588,063 A   12/1996 Edgar
(Continued)

FOREIGN PATENT DOCUMENTS

CN   101438604 A   5/2009
CN   102860041     1/2013
(Continued)

OTHER PUBLICATIONS

Office Action for Chinese Application No. 201811309706.0 dated May 21, 2020, 11 pages.
(Continued)

*Primary Examiner* — Sonia L Gay
(74) *Attorney, Agent, or Firm* — Womble Bond Dickinson (US) LLP

(57) ABSTRACT

An audio system that adjusts one or more beam patterns emitted by one or more loudspeaker arrays based on the preferences of users/listeners is described. The audio system includes an audio receiver that contains a listener location estimator, a listener identifier, and a voice command processor. Inputs from the listener location estimator, the listener identifier, and the voice command processor are fed into an array processor. The array processor drives the one or more loudspeaker arrays to emit beam patterns into the listening area based on inputs from each of these devices. By examining the location, preferred usage settings, and voice commands from listeners, the generated beam patterns are customized to the explicit and implicit preferences of the (Continued)

listeners with minimal direct input. Other embodiments are also described.

21 Claims, 13 Drawing Sheets

Related U.S. Application Data

(60) Provisional application No. 61/907,946, filed on Nov. 22, 2013.

(51) Int. Cl.
*H04S 7/00* (2006.01)
*H04R 1/40* (2006.01)
*H04R 1/08* (2006.01)

(52) U.S. Cl.
CPC ......... *H04R 1/403* (2013.01); *H04R 2203/12* (2013.01); *H04R 2430/23* (2013.01)

(56) References Cited

U.S. PATENT DOCUMENTS

| | | | | |
|---|---|---|---|---|
| 5,977,964 | A * | 11/1999 | Williams | H04N 7/10 715/721 |
| 2001/0050995 | A1 | 12/2001 | Belt et al. | |
| 2006/0204022 | A1 * | 9/2006 | Hooley | H04R 5/02 381/117 |
| 2006/0262935 | A1 | 11/2006 | Goose et al. | |
| 2008/0101624 | A1 | 5/2008 | Schentrup et al. | |
| 2009/0304205 | A1 | 12/2009 | Hardacker et al. | |
| 2012/0020480 | A1 | 1/2012 | Visser et al. | |
| 2012/0249785 | A1 | 10/2012 | Sudo et al. | |
| 2013/0156198 | A1 * | 6/2013 | Kim | H04S 7/303 381/17 |
| 2013/0183944 | A1 * | 7/2013 | Mozer | H04L 12/282 455/414.1 |

FOREIGN PATENT DOCUMENTS

| | | |
|---|---|---|
| EP | 2551763 | 1/2013 |
| WO | 2006059299 | 6/2006 |
| WO | 2007113718 | 10/2007 |

OTHER PUBLICATIONS

Chinese Office Action dated Aug. 21, 2019 for related Chinese Appln. No. 201811309706.0 6 Pages.
Chinese Office Action for Chinese Application No. 201811309706.0 with English translation, ated Feb. 3, 2020, 24 pages.
Australian Examination Report for Australian Application No. 2019202553, dated Feb. 28, 2020, 5 pages.
European Article 94(3) EPC for European Application No. 14784165. 4, dated Mar. 13, 2020, 6 pages.
Summons to Attend Oral Proceedings Pursuant to Rule 115(1) EPC for European Application No. 14784165.4 dated Dec. 21, 2020, 7 pages.
Notification of the First Office Action for Chinese Application No. 202011260248.3 dated Jun. 14, 2022, 11 pages.

* cited by examiner

HANDSFREE BEAM PATTERN CONFIGURATION

RELATED MATTERS

This application is a continuation of Ser. No. 15/037,302, filed May 17, 2016, which is a U.S. National Phase Application under 35 U.S.C. § 371 of International Application No. PCT/US2014/057547, filed Sep. 25, 2014, which claims the benefit of the earlier filing date of U.S. provisional application No. 61/907,946, filed Nov. 22, 2013.

FIELD

A system and method for configuring and adjusting beam patterns output by a speaker system in response to voice commands is described. Other embodiments are also described.

BACKGROUND

Loudspeaker arrays may generate beam patterns that focus sound in a specific direction. For example, sets of transducers in a loudspeaker array may be individually and separately driven according to different parameters and settings, including delays and energy levels, to generate one or more beam patterns in a listening area. The beam patterns may focus sound at a particular object or individual in the listening area.

Although beam patterns allow sound to be focused in different directions and/or at specific objects or individuals, configuring beam patterns is often a complex and arduous process. For example, as noted above, configuration of a beam pattern may require individually and separately adjusting delays and energy levels of driving signals for each transducer in a loudspeaker array to achieve a desired result.

SUMMARY

One embodiment of the invention is directed to an audio system that adjusts one or more beam patterns emitted by one or more loudspeaker arrays based on the preferences of users/listeners. In one embodiment, the audio system includes an audio receiver that is comprised of a listener location estimator, a listener identifier, and a voice command processor. The listener location estimator estimates the location of one or more listeners in a listening area based on sensed voice commands received from one or more microphone arrays. The listener identifier attempts to associate the one or more listeners with user profiles based on comparisons of the voice commands with stored speech signatures. The user profiles are associated with preferred settings, which have been personalized for each identified listener based on previous use of the audio system. The voice command processor determines settings designated by listeners in each voice command.

Inputs from the listener location estimator, the listener identifier, and the voice command processor are fed into an array processor. The array processor drives the one or more loudspeaker arrays to emit beam patterns into the listening area based on inputs from each of these devices. By examining the location, historical preferred usage settings, and voice commands from listeners, the generated beam patterns are customized to the explicit and implicit preferences of the listeners with minimal direct input.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
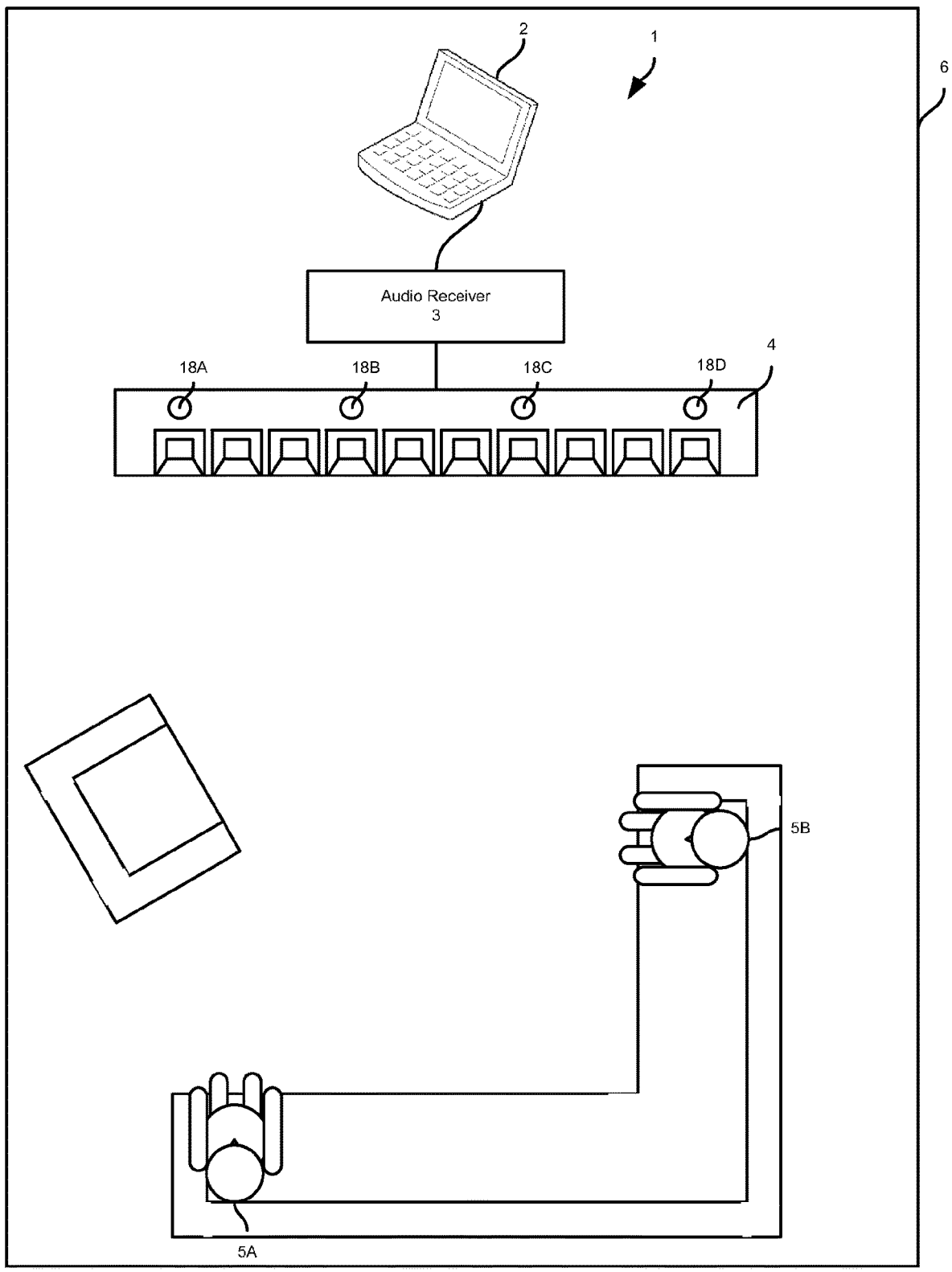
FIG. 1 shows an overhead view of an audio system according to one embodiment of the invention.

FIG. 1 shows an overhead view of an audio system 1 according to one embodiment of the invention. The audio system 1 may include an external audio source 2, an audio receiver 3, and a loudspeaker array 4. The audio system 1 outputs sound program content into a room or listening area 6 in which one or more intended listeners 5A and 5B are located. The listeners 5A and 5B may be seated at various positions in the listening area 6 and the audio receiver 3 may adjust sound output by the loudspeaker array 4 according to commands and preferences of the listeners 5A and 5B as will be described in further detail below.

The external audio source 2 may be any device capable of transmitting one or more audio streams representing sound program content to the audio receiver 3 for processing. For example, the external audio source 2 in the system 1 of FIG. 1 is a laptop computer that transmits one or more audio streams representing sound program content to the audio receiver 3 for processing either through a wired or wireless connection. In other embodiments, the external audio source 2 may instead be one or more of a desktop computer, a laptop computer, a tablet computer, a mobile device (e.g., a mobile phone or mobile music player), and a remote media server (e.g., an Internet streaming music or movie service), a set top box, a television, a game system, a personal video recorder, a DVD player, a Bluray player, etc.

As shown in FIG. 1, the components of the audio system 1 are distributed and contained in separate units. In other embodiments, the audio receiver 3 is integrated within the loudspeaker array 4 to provide a standalone unit. In this embodiment, the loudspeaker array 4 receives one or more audio streams representing sound program content directly from the external audio source 2 either through wired or wireless connections.

Although described as receiving audio streams from the external audio source 2, the audio receiver 3 may access audio streams stored in a local storage medium. In this embodiment, the audio receiver 3 retrieves the audio streams from the local storage medium for processing without interaction with an external audio source 2.

As will be described in further detail below, the audio receiver 3 may be any type of device or set of devices for processing streams of audio and driving one or more loudspeaker arrays 4. For example, the audio receiver 3 may be a laptop computer, a desktop computer, a tablet computer, a mobile device, a home theatre audio receiver, or a set of hardware processors and logic structures capable of processing audio signals.

Figure 2A:
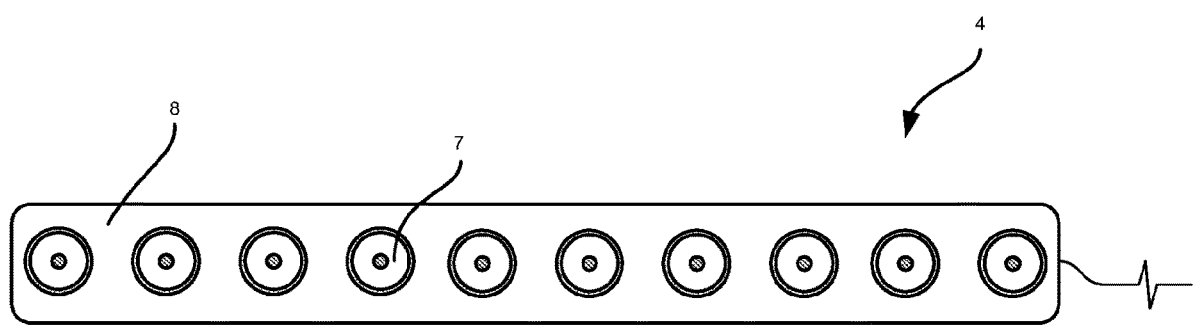
FIG. 2A shows a loudspeaker array housed in a single cabinet according to one embodiment.
Figure 2B:
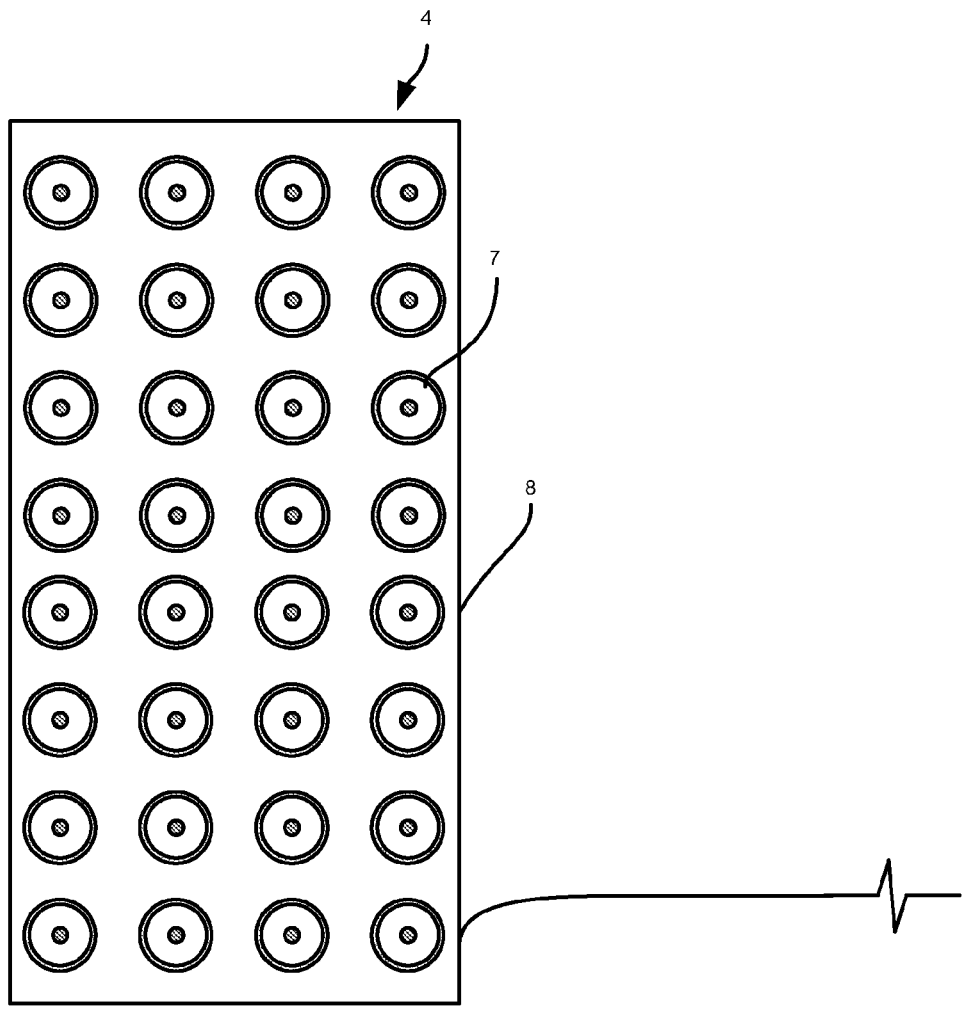
FIG. 2B shows a loudspeaker array housed in a single cabinet according to another embodiment.

Turning now to the loudspeaker array 4, FIG. 2A shows one loudspeaker array 4 with multiple transducers 7 housed in a single cabinet 8. In this example, ten transducers 7 may be aligned in a single row in the cabinet 8 to form a sound-bar style loudspeaker array 4. In another example shown in FIG. 2B, a loudspeaker array 4 may have thirty-two distinct transducers 7 evenly aligned in eight rows and four columns within the cabinet 8. In other embodiments, different numbers of transducers 7 may be used with uniform or non-uniform spacing. Although shown as aligned in a flat plane or straight line, the transducers 7 may be aligned in a curved fashion along an arc.

The transducers 7 may be any combination of full-range drivers, mid-range drivers, subwoofers, woofers, and tweeters. Each of the transducers 7 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 7 magnetic system interact, generating a mechanical force that causes the coil (and thus, the attached cone) to move back and forth, thereby reproducing sound under the control of the applied electrical audio signal coming from a source (e.g., a signal processor, a computer, and an audio receiver).

Each transducer 7 may be individually and separately driven to produce sound in response to separate and discrete audio signals. By allowing the transducers 7 in the loudspeaker array 4 to be individually and separately driven according to different parameters and settings (including delays and energy levels), the loudspeaker array 4 may produce numerous directivity/beam patterns to simulate or better represent respective channels of sound program content played according to the preferences of the listeners 5. For example, beam patterns of different widths/directivities and angles may be emitted by the loudspeaker array 4.

As shown in FIG. 1, the loudspeaker array 4 may include wires or conduit for connecting to the audio receiver 3. For example, the loudspeaker array 4 may include multiple wiring points and the audio receiver 3 may include complementary wiring points. The wiring points may be binding posts or spring clips on the back of the loudspeaker array 4 and the audio receiver 3, respectively. The wires are separately wrapped around or are otherwise coupled to respective wiring points to electrically couple the loudspeaker array 4 to the audio receiver 3.

In other embodiments, the loudspeaker array 4 may be coupled to the audio receiver 3 using wireless protocols such that the array 4 and the audio receiver 3 are not physically joined but maintain a radio-frequency connection. For example, the loudspeaker array 4 may include a WiFi receiver for receiving audio signals from a corresponding WiFi transmitter in the audio receiver 3. In some embodiments, the loudspeaker array 4 may include integrated amplifiers for driving the transducers 7 using the wireless audio signals received from the audio receiver 3. As noted above, the loudspeaker array 4 may be a standalone unit that includes components for signal processing and for driving each transducer 7 according to the techniques described below.

Although shown in FIG. 1 as including a single loudspeaker array 4, the audio system 1 may include any number of loudspeaker arrays 4 that are coupled to the audio receiver 3 through wireless or wired connections. For example, the audio system 1 may include six loudspeaker arrays 4 that respectively represent a front left channel, a front center channel, a front right channel, a rear right surround channel, a rear left surround channel, and a low frequency channel (e.g., a subwoofer) of a piece of sound program content. In another embodiment, the audio system 1 may include two loudspeaker arrays 4 that represent front left and front right channels of a piece of stereo sound program content.

Figure 3:
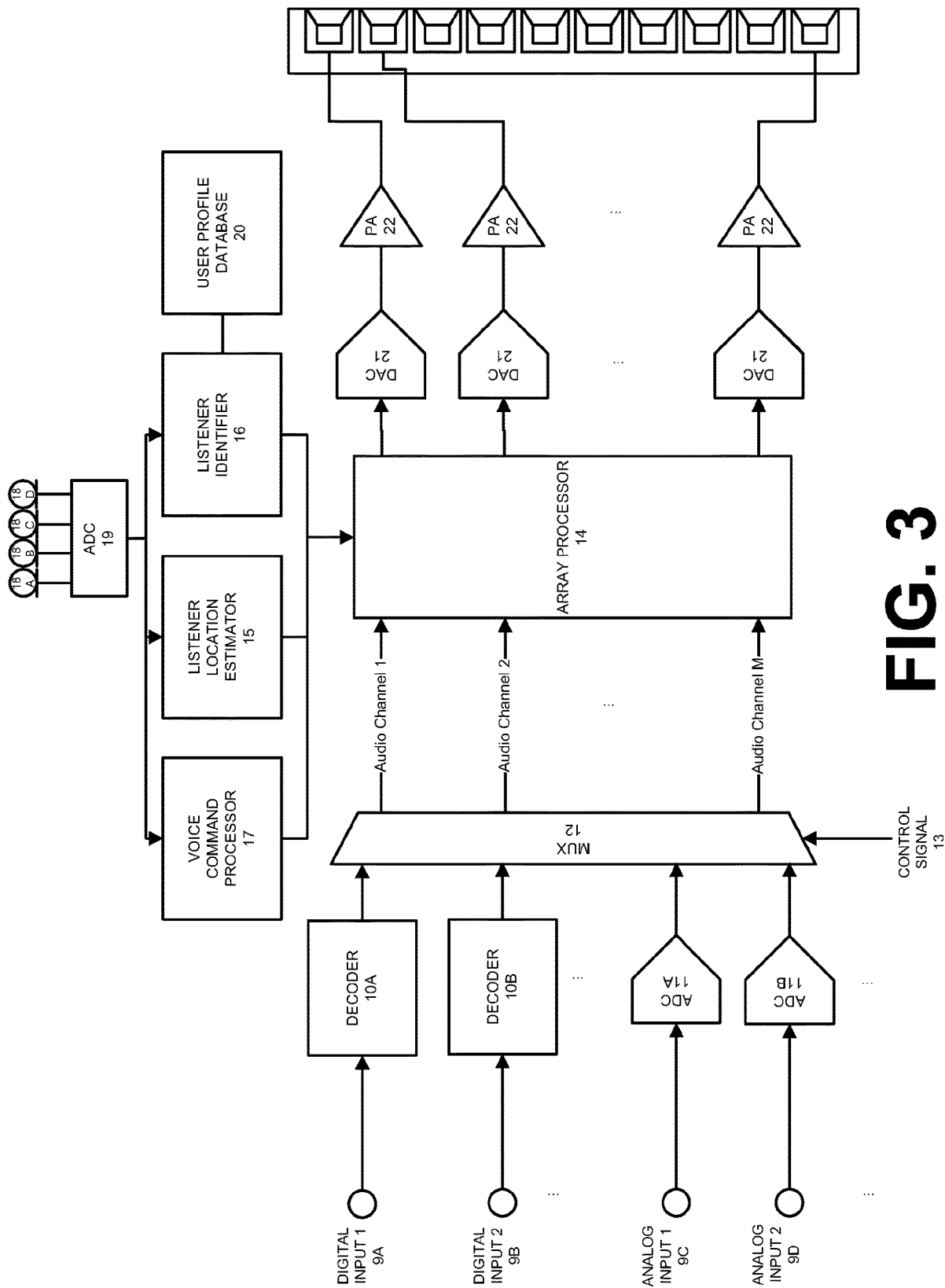
FIG. 3 shows a functional unit block diagram and some constituent hardware components of an audio receiver according to one embodiment.

FIG. 3 shows a functional unit block diagram and some constituent hardware components of the audio receiver 3 according to one embodiment. The components shown in FIG. 3 are representative of elements included in the audio receiver 3 and should not be construed as precluding other components. Each element of FIG. 3 will be described by way of example below.

The audio receiver 3 may include multiple inputs 9 for receiving one or more channels of sound program content using electrical, radio, or optical signals from one or more external audio sources 2. The inputs 9 may be a set of digital inputs 9A and 9B and analog inputs 9C and 9D including a set of physical connectors located on an exposed surface of the audio receiver 3. For example, the inputs 9 may include a High-Definition Multimedia Interface (HDMI) input, an optical digital input (Toslink), a coaxial digital input, and a phono input. In one embodiment, the audio receiver 3 receives audio signals through a wireless connection with the external audio source 2. In this embodiment, the inputs 9 include a wireless adapter for communicating with the external audio source 2 using wireless protocols. For example, the wireless adapter may be capable of communicating using Bluetooth, IEEE 802.11x, cellular Global System for Mobile Communications (GSM), cellular Code division multiple access (CDMA), or Long Term Evolution (LTE) protocols.

In one embodiment, the external audio source 2 and the audio receiver 3 are integrated in one indivisible unit. In this embodiment, the loudspeaker array 4 may also be integrated into the same unit. For example, the external audio source 2 and the audio receiver 3 may be in one computing unit with transducers 7 integrated in left and right sides of the unit.

Returning to the audio receiver 3, general signal flow from the inputs 9 will now be described. Looking first at the digital inputs 9A and 9B, upon receiving a digital audio signal through the input 9A and/or 9B, the audio receiver 3 uses a decoder 10A or 10B to decode the electrical, optical, or radio signals into a set of audio channels representing sound program content. For example, the decoder 10A may receive a single signal containing six audio channels (e.g., a 5.1 signal) and decode the signal into six audio channels. The decoders 10 may be capable of decoding an audio signal encoded using any codec or technique, including Advanced Audio Coding (AAC), MPEG Audio Layer II, MPEG Audio Layer III, and Free Lossless Audio Codec (FLAC).

Turning to the analog inputs 9C and 9D, each analog signal received by analog inputs 9C and 9D may represent a single audio channel of the sound program content. Accordingly, multiple analog inputs 9C and 9D may be needed to receive each channel of a piece of sound program content. The audio channels may be digitized by respective analog-to-digital converters 11A and 11B to form digital audio channels.

The digital audio channels from each of the decoders 10A and 10B and the analog-to-digital converters 11A and 11B are fed to the multiplexer 12. The multiplexer 12 selectively outputs a set of audio channels based on a control signal 13. The control signal 13 may be received from a control circuit or processor in the audio receiver 3 or from an external device. For example, a control circuit controlling a mode of operation of the audio receiver 3 may output the control signal 13 to the multiplexer 12 for selectively outputting a set of digital audio channels.

The multiplexer 12 feeds the selected digital audio channels to an array processor 14. The channels output by the multiplexer 12 are processed by the array processor 14 to produce a set of processed driving signals. The processing may operate in both the time and frequency domains using transforms such as the Fast Fourier Transform (FFT). The array processor 14 may be a special purpose processor such as application-specific integrated circuit (ASIC), a general purpose microprocessor, a field-programmable gate array (FPGA), a digital signal controller, or a set of hardware logic structures (e.g., filters, arithmetic logic units, and dedicated state machines). The array processor 14 generates the set of signals for driving the transducers 7 in the loudspeaker array 4 based on inputs from a listener location estimator 15, a listener identifier 16, and/or a voice command processor 17.

Figure 4A:
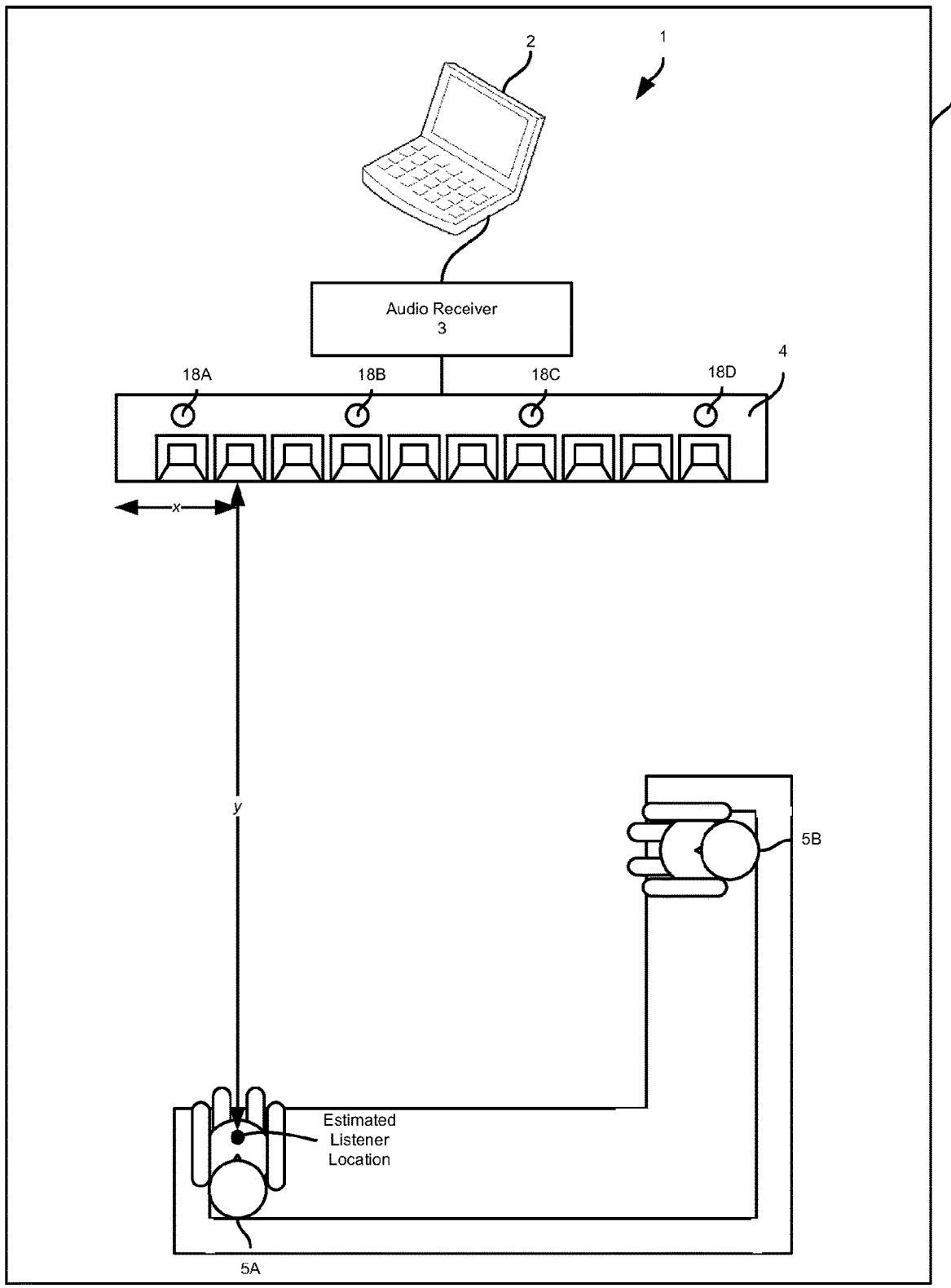
FIGS. 4A-4D shows the estimated location of a listener in the listening area.
Figure 4B:
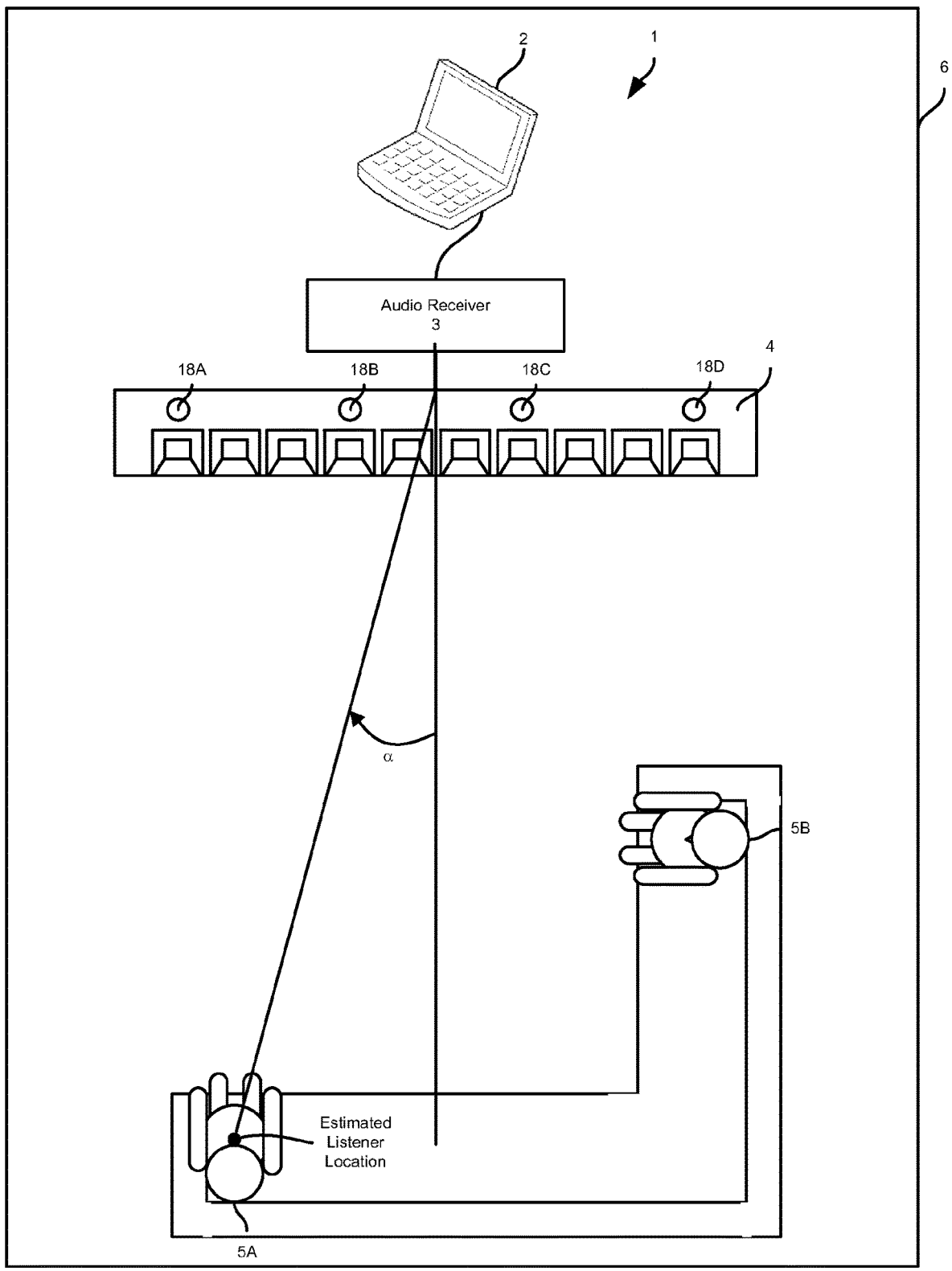

The listener location estimator 15 estimates the location of one or more human listeners 5 in the listening area 6. For example, the location estimator 15 may estimate the physical coordinates of a listener 5 in the listening area 6 or angle of a listener 5 relative to the loudspeaker array 4. FIG. 4A shows the estimated location of the listener 5A in the listening area 6. The estimated location is defined by coordinates x, y, relative to a side of the loudspeaker array 4. Although shown in FIG. 4A as Cartesian coordinates, the estimated location of the listener 5A may be represented as an angle relative to the loudspeaker array 4 as shown in FIG. 4B (e.g., listener 5A is degrees to the left of the longitudinal axis of the loudspeaker array 4). Although described in relation to a single listener 5, the location estimator 15 may estimate the location of multiple listeners 5 in the listening area 6 (e.g., the listeners 5A and 5B).

The listener location estimator 15 may use any device or algorithm for estimating the location of the listeners 5. In one embodiment, one or more microphones 18A-18D may be communicatively coupled to the listener location estimator 15 for assisting in determining the location of one or more listeners 5 in the listening area 6. In one embodiment, the microphones 18A-18D are directly coupled to an audio codec 19. The audio codec 19 may be used for coding or decoding a data stream or signals received from the microphones 18A-18D. In one embodiment, the audio codec 19 performs conversion between the analog domain and the digital domain for the microphone signals produced by the microphones 18A-18D, in addition to digital audio signal processing.

In one embodiment, the microphones 18A-18D are integrated in the loudspeaker array 4 and microphone signals corresponding to sensed sounds are transmitted to the audio receiver 3 using one or more wireless protocols (e.g., Bluetooth and IEEE 802.11x). For example, as shown in FIGS. 1, 4A, and 4B, the microphones 18A-18D are integrated into the loudspeaker array 4. The microphones 18A-18D may be any type of acoustic-to-electric transducer or sensor, including a MicroElectrical-Mechanical System (MEMS) microphone, a piezoelectric microphone, an electret condenser microphone, or a dynamic microphone. The microphones 18A-18D may provide a range of polar patterns, such as cardioid, omnidirectional, and figure-eight. In one embodiment, the polar patterns of the microphones 18A-18D may vary continuously over time.

In one embodiment, the microphones 18A-18D may form a microphone array 18. The listener location estimator 15 may receive inputs from the microphone array 18 and estimate the location of a listener 5 based on these inputs. In one embodiment, the microphone array 18 may sense a voice command from a listener 5 in the listening area 6 and estimate the location of the listener 5 based on the sensed voice command. For example, the listener 5 may command the audio system 1 to output sound by saying "Play music." In response to sensing by the microphone array 18 this command, the location estimator 15 may begin attempting to locate the speaking listener 5 in the listening area 6. In another example, the listener 5 may instigate the location estimator 15 to locate the listener 5 in the listening area 6 by greeting/addressing the audio system 1 (e.g., "Hello System" where the audio system 1 is named "System").

In one embodiment, the listener location estimator 15 estimates the location of one or more of the listeners 5 in the listening area 6 by determining the angle of arrival for the sensed sounds (i.e., the sensed voice command). For example, the location estimator 15 may estimate the angle of arrival by running sensed microphone signals received from the microphone array 18 through a number of beamformers pointing in a discrete number of angles/directions. The energy output from each beamformer is calculated and the direction with the largest energy is chosen as the angle of arrival. Although described in relation to the angle or direction of the listener 5 to the loudspeaker array 4, in one embodiment the location estimator 15 may also estimate the distance of the listener 5 from the loudspeaker array 4 based on the sensed microphone signals received from the microphone array 18.

Figure 4C:
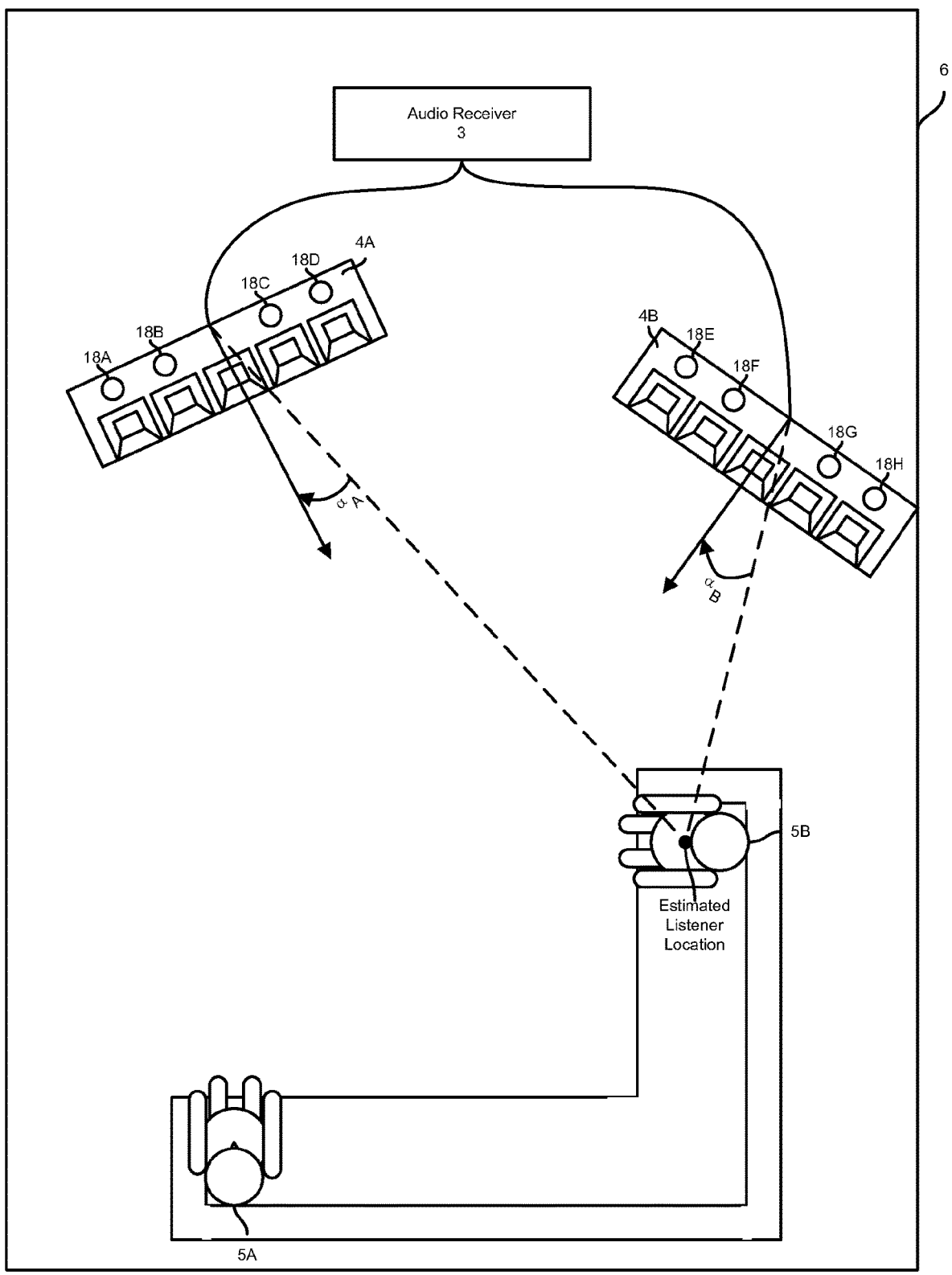

In one embodiment, multiple microphone arrays 18 may be used to estimate the location of one or more of the listeners 5 in the listening area 6. For example, as shown in FIG. 4C, multiple loudspeaker arrays 4A and 4B may each include separate microphone arrays 18 composed of microphones 18A-18D and 18E-18H, respectively. Knowing the relative geometry of the loudspeaker arrays 4A and 4B, the location of one or more listeners 5 may be estimated using triangulation. In this example, the estimated location of the listeners 5 may be used to adjust beam patterns generated by loudspeaker arrays 4A and 4B for angle and distance. For example, the loudspeaker array 4A that is farther from the listener 5B than loudspeaker array 4B may have its gain increased such that the audio system 1 sounds more balanced to the listener 5B.

Figure 4D:
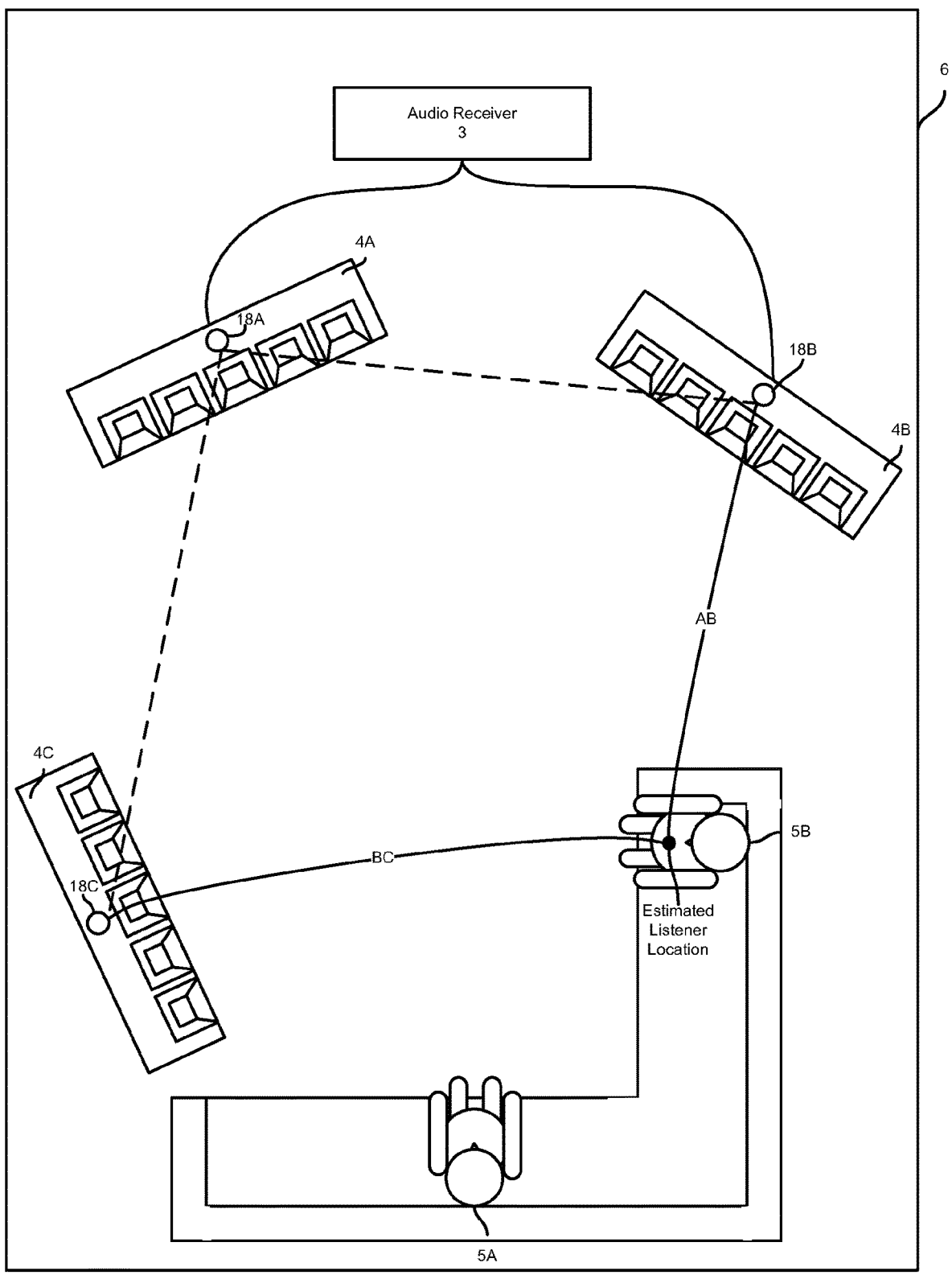

In another embodiment, multiple individual microphones 18A-18C may be used to estimate the location of one or more of the listeners 5 in the listening area 6. For example, as shown in FIG. 4D, multiple loudspeaker arrays 4A-4C may each include separate microphones 18A-18C. Knowing the relative geometry of the loudspeaker arrays 4A-4C, the location of one or more listeners 5 may be estimated using time delays of arrival of the sound at each microphone 18A-18C. For example, if the microphone 18B senses a voice command a time $d_{AB}$ later than the microphone 18A, then the listener 5B sits on a constant delay line AB. Similarly, if microphone 18B senses the voice command a time $d_{BC}$ later than the microphone 18C, then the listener 5B sits on a constant delay line BC. The intersection of the delay lines AB and BC represents an estimate of the location of the listener 5B. The estimated location of the listener 5B may be used to adjust beam patterns generated by loudspeaker arrays 4A-4C.

In one embodiment, the audio receiver 3 may also include a listener identifier 16 for determining the identity of the listeners 5 in the listening area 6. In one embodiment, the listener identifier 16 receives signals from the microphone array 18. The signals may represent voice commands or other speech spoken by a listener 5. The listener identifier 16 compares these speech signals against patterns corresponding to known users/listeners. For example, the audio receiver 3 may include a user profile database 20 which stores speech patterns of known users/listeners. The stored speech patterns may be recorded during normal use of the audio system 1 or during a configuration of the audio system 1.

Based on the comparison, the listener identifier 16 associates speech from a listener 5 with a known user profile. The user profile may include one or more preferences for the identified listener 5. For example, the preferences may include preferred volume settings, preferred bass level settings, preferred treble level settings, preferred reverberation level settings, preferred equalization settings, a common seating spot in the listening area 6, and/or other similar settings/preferences. In one embodiment, upon failure to match speech from a listener 5 with stored speech patterns associated with user profiles, the listener identifier 16 may generate a new user profile for the new listener 5. The newly created user profile may be initialized with default settings. As the new listener 5 uses the audio system 1 over time and alters settings based on preference (e.g., using voice commands processed by the voice command processor 17), the user profile settings may adapt to match these preferences.

For example, in response to the listener 5A's request to increase the volume, the listener 5A's user profile may be updated to indicate a preference for higher volume. Accordingly, during subsequent use of the audio system 1 by the listener 5A, the volume of audio output by the audio receiver 3 and the loudspeaker array 4 may begin at a higher volume. Similar adjustments may be made to other user profile preferences based on the use of the audio system 1 over time by each of the listeners 5.

In one embodiment, user profile settings are content based such that each setting in a listener 5's user profile may have separate values for different content types. For example, a volume setting may have separate preferred values for music, movies, television, etc. These content delineations may be further divided based on genre (e.g., separate volume settings for comedy movies, honor movies, and drama movies).

In one embodiment, the user profile setting may be similarly divided by time of day. For example, preferred volume settings may be based on time of day such that during the morning hours a preferred volume setting is at a first value (e.g., 15 dB) and during the afternoon hours the preferred volume setting is at a second value (e.g., 20 dB). Although described in relation to volume settings, each user profile setting for each listener 5 may be similarly divided.

In one embodiment, the audio receiver 3 may also include a voice command processor 17. The voice command processor 17 receives signals from the microphone array 18 either directly or indirectly through the audio codec 19. The microphone signals may represent voice commands spoken by a listener 5. The voice command processor 17 processes these microphone signals to determine the intended command from the listener 5 and transmits corresponding control signals to the array processor 14 to carry out the command. For example, the microphone signals may correspond to the listener 5A stating "Hi, System!" or "System, add me!" In response to receipt of these microphone signals, the voice command processor 17 may transmit control signals to cause the array processor 14 to generate a beam pattern directed at the listener 5A. In this example, the beam pattern may be generated also based on inputs from the listener location estimator 15 and the listener identifier 16 such that the beam pattern is focused on the current location of the listener 5A and according to preferences of the listener 5A.

In one embodiment, the listener 5A may focus a beam pattern at preset zones, positions, or spots in the listening area 6 instead of the estimated location of the listener 5 determined by the listener location estimator 15. For example, the listener 5A may state "Spot 2 at half volume." In this example, spot 2 may be preset to be the right and forward-most seat on a couch in the listening area 6 where the listener 5B is located. In response to this request from listener 5A, the voice command processor 17 transmits control signals such that the array processor 14 drives the loudspeaker array 4 to generate a beam pattern at spot 2 in the listening area 6 with half volume.

In one embodiment, a beam pattern may be directed at an identified listener 5 based on historical usage of the audio system 1. For example, after continual use of the audio system 1 by listener 5A at 6:00 PM for several days with sound beams directed at predefined spots 1 and 2, subsequent use of the audio system 1 by listener 5A at or around 6:00 PM will default to directing sound beams at predefined spots 1 and 2. In one embodiment, the audio system 1 may default to the last known position of one more listeners 5 upon the listener location estimator 15 being unable to estimate the location of the listeners 5. The last know locations of the listeners 5 may be stored in the user profile database 20 along with common/preferred seating locations in the listening area 6.

As described above, the voice command processor 17 analyzes voice commands to determine operations to perform. The voice commands may be preset operations. For example, the listener 5A may state "Equalize for trance music." In response to this request, the voice command processor 17 transmits control signals which cause the array processor 17 to equalize the input audio based on preset equalization settings for trance music. In another example, the listener 5A may state "System, flood the room!" In response to this request, the voice command processor 17 transmits control signals which cause the array processor 17 to drive the loudspeaker array 4 to generate a wide beam pattern that encompasses the entire listening area 6.

As described above, based on inputs from the listener location estimator 15, the listener identifier 16, and/or the voice command processor 17 one or more audio channels of a piece of sound program content are modified by the array processor 14 to generate beam patterns according to preferences of the listeners 5. The processed segments of the sound program content are passed from the array processor 14 to the one or more digital-to-analog converters 21 to produce one or more distinct analog signals. The analog signals produced by the digital-to-analog converters 21 are fed to the power amplifiers 22 to drive selected transducers 7 of the loudspeaker array 4 to produce the desired beam patterns.

Figure 5:
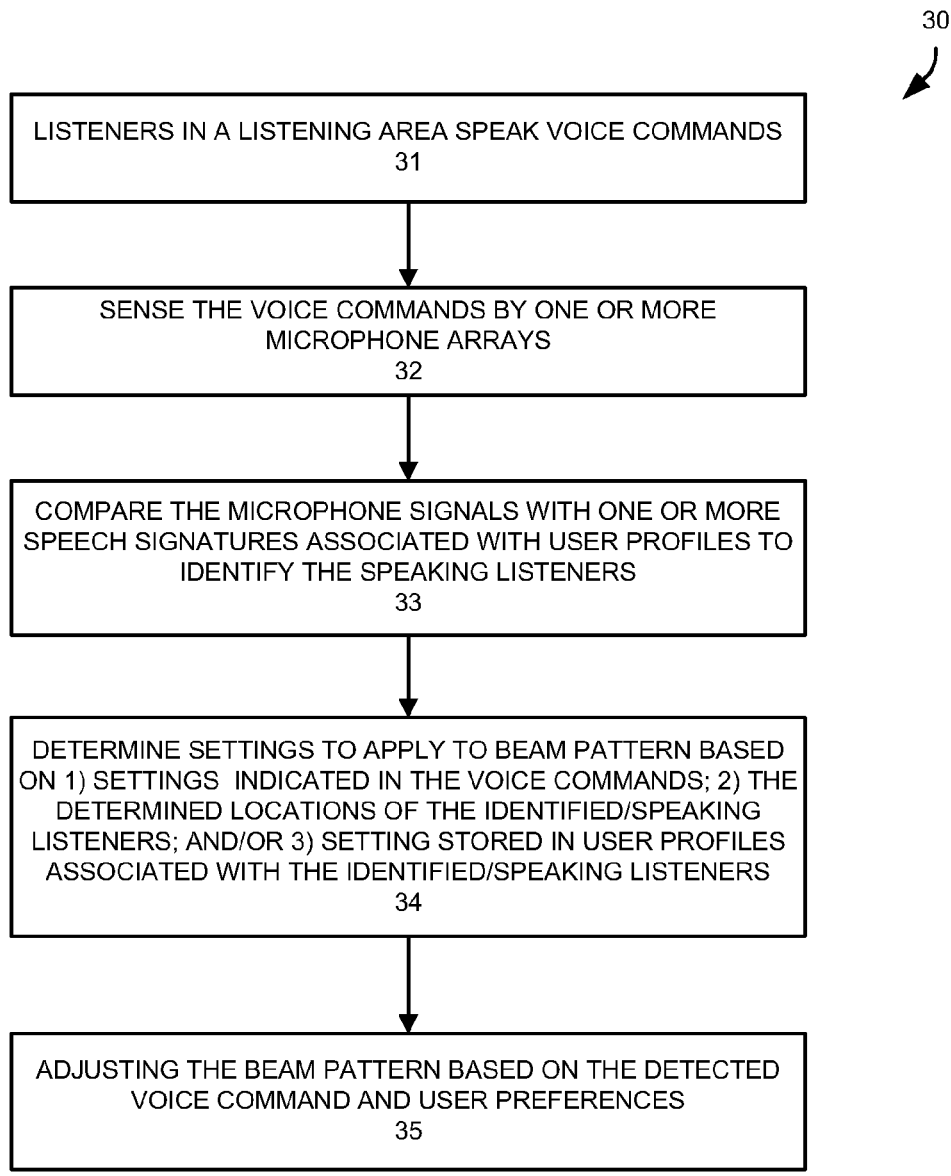
FIG. 5 shows a method for adjusting sound emitted by the loudspeaker array according to one embodiment.

Turning now to FIG. 5, a method 30 for adjusting sound emitted by the loudspeaker array 4 will be described. The operations of method 30 may be performed by one or more components of the audio receiver 3, the loudspeaker array 4, and other devices of the audio system 1.

Figure 6A:
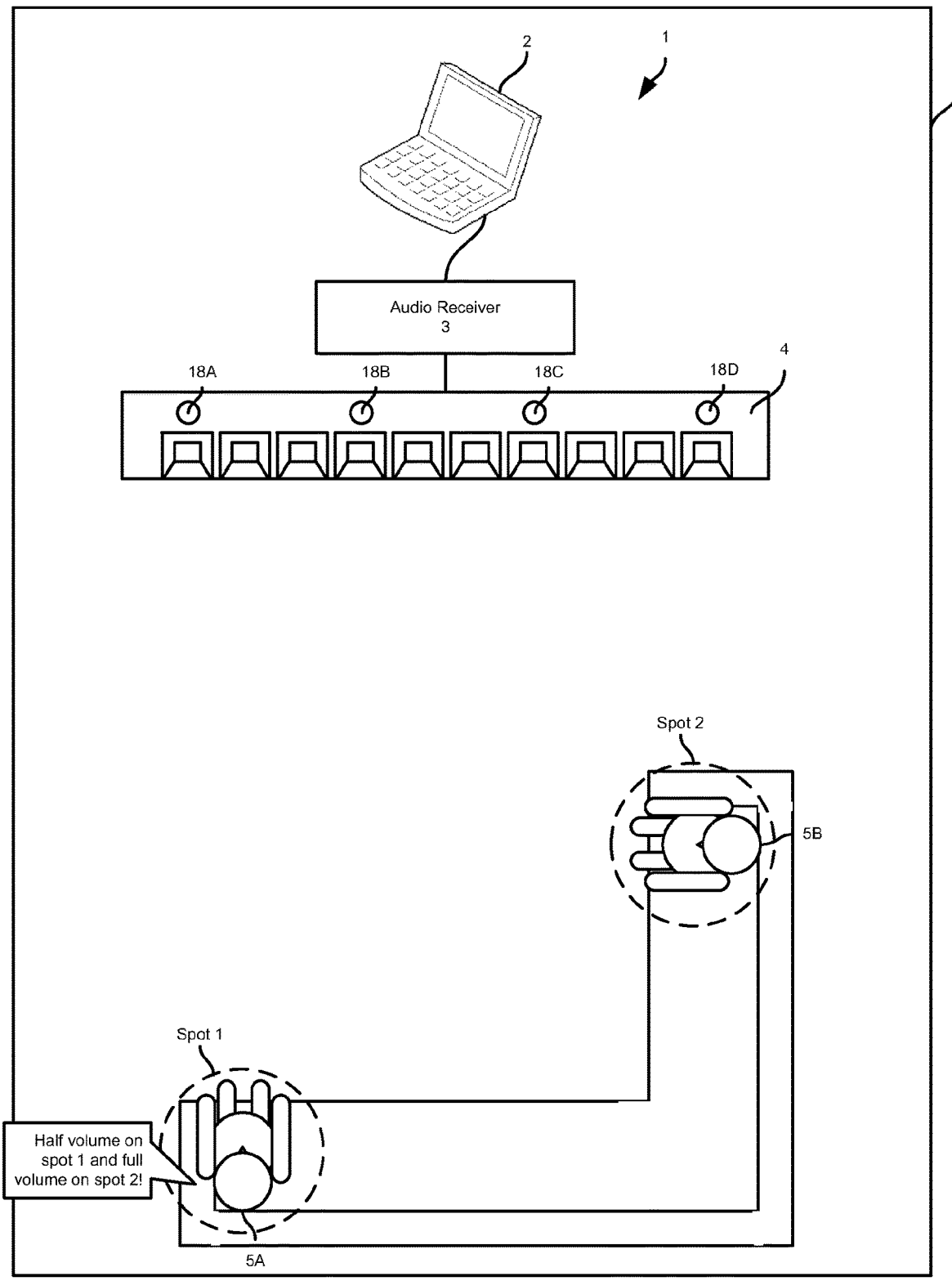
FIGS. 6A and 6B show examples of a listener speaking separate voice commands.
Figure 6B:
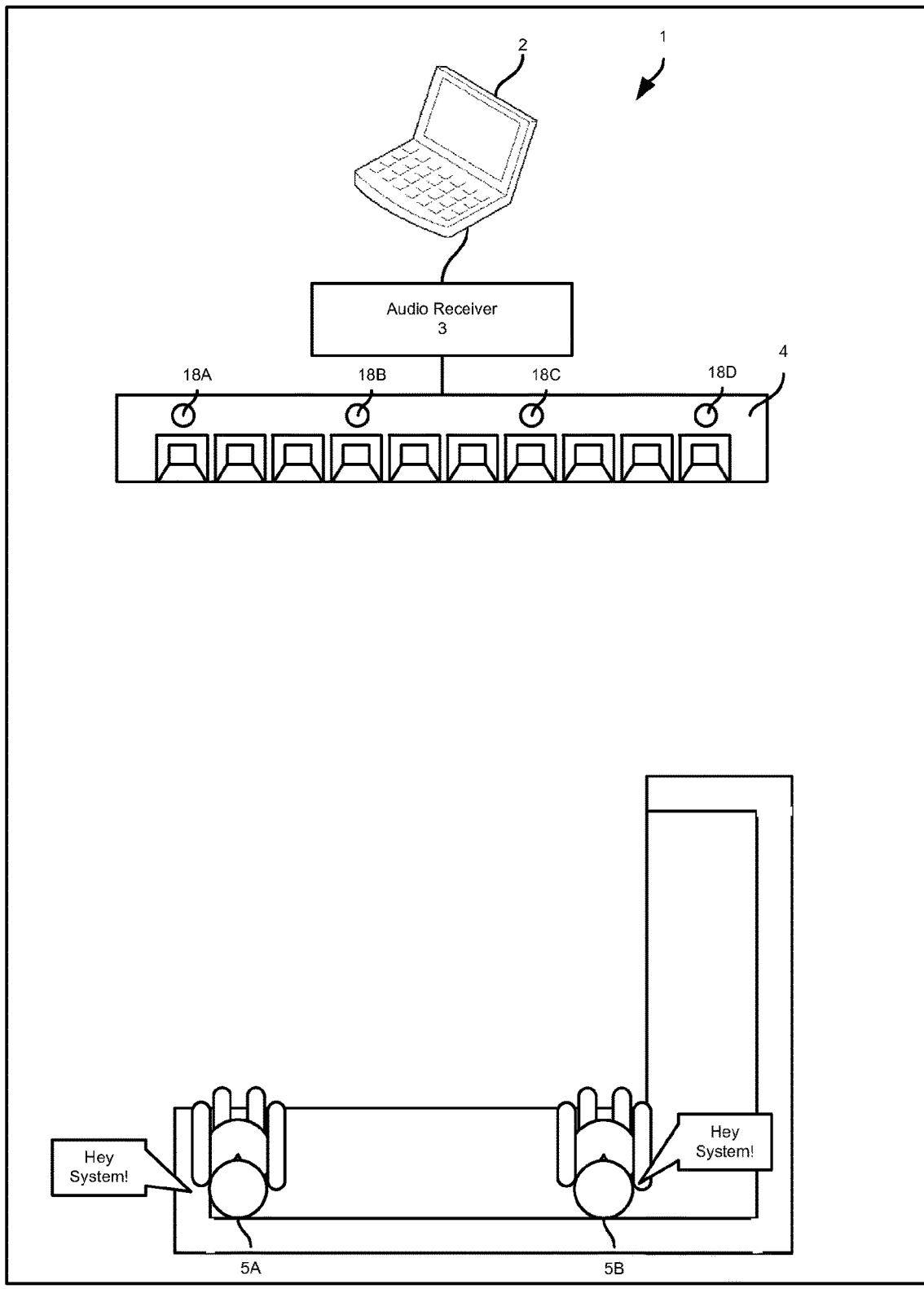

In one embodiment, the method 30 begins at operation 31 with a listener 5 speaking a voice command. The voice command may indicate the listener 5's desire to have a sound beam focused on him/her or a designated location in the listening area 6, adjust sound emitted by the loudspeaker array 4 (e.g., volume, equalization, and reverberation), and/or other similar modifications. FIG. 6A and FIG. 6B show examples of the listener 5A speaking separate voice commands.

Following a listener uttering a voice command, operation 32 senses the voice command using one or more microphone arrays 18. The microphone arrays 18 may be incorporated into one or more loudspeaker arrays 4, respectively, or coupled directly to the audio receiver 3. Microphone signals corresponding to the sensed voice command may be relayed to the audio receiver 3 for further processing as will be described in further detail below.

At operation 33, the microphone signals are compared against one or more speech patterns/signatures associated with user profiles to identify the speaking listener 5. The comparison may use any known technique for performing voice recognition such that the speaking listener 5 is identified. In one embodiment, upon failure to match speech from a listener 5 with stored speech patterns/signatures associated with user profiles, operation 33 may generate a new user profile for the new listener 5. The newly created user profile may be initialized with default settings. As the new listener 5 uses the audio system 1 over time and alters settings based on preference (e.g., voice commands), the user profile settings may adapt to match these preferences.

At operation 34, the method 30 determines settings to apply to a beam pattern that will be generated by the audio receiver 3 and the loudspeaker array 4. The settings may be based on indications in the sensed voice command, the estimated location of the speaking/identified listener 5, and/or preferences stored in a user profile associated with the speaking/identified listener 5. For example, operation 35 may determine an estimated location of the speaking/identified listener 5 using the listener location estimator 15 as described above. Using this estimated location, operation 35 may determine a direction setting for steering the beam pattern. In another example, the sensed voice command may state "Reduce sound to half volume." In response to this voice command, operation 35 may determine a volume setting for the beam pattern. In still another example, operation 35 may determine equalization settings for audio emitted through the beam pattern based on stored preferences in an associated user profile.

Based on the example voice command in FIG. 6A, operation 34 may determine settings for a first beam pattern directed to spot 1 with half volume and second beam pattern directed to spot 2 with full volume. Other settings may be determined based on the identity of listeners 5A and 5B, the time of day, the audio content, etc. Based on the example voice command in FIG. 6A, operation 34 may determine settings for a first beam pattern directed at the estimated location of the listener 5A and a second beam pattern directed at the estimated location of the listener 5B. Other settings may be determined based on the identity of listeners 5A and 5B, the time of day, the audio content, etc.

Figure 7A:
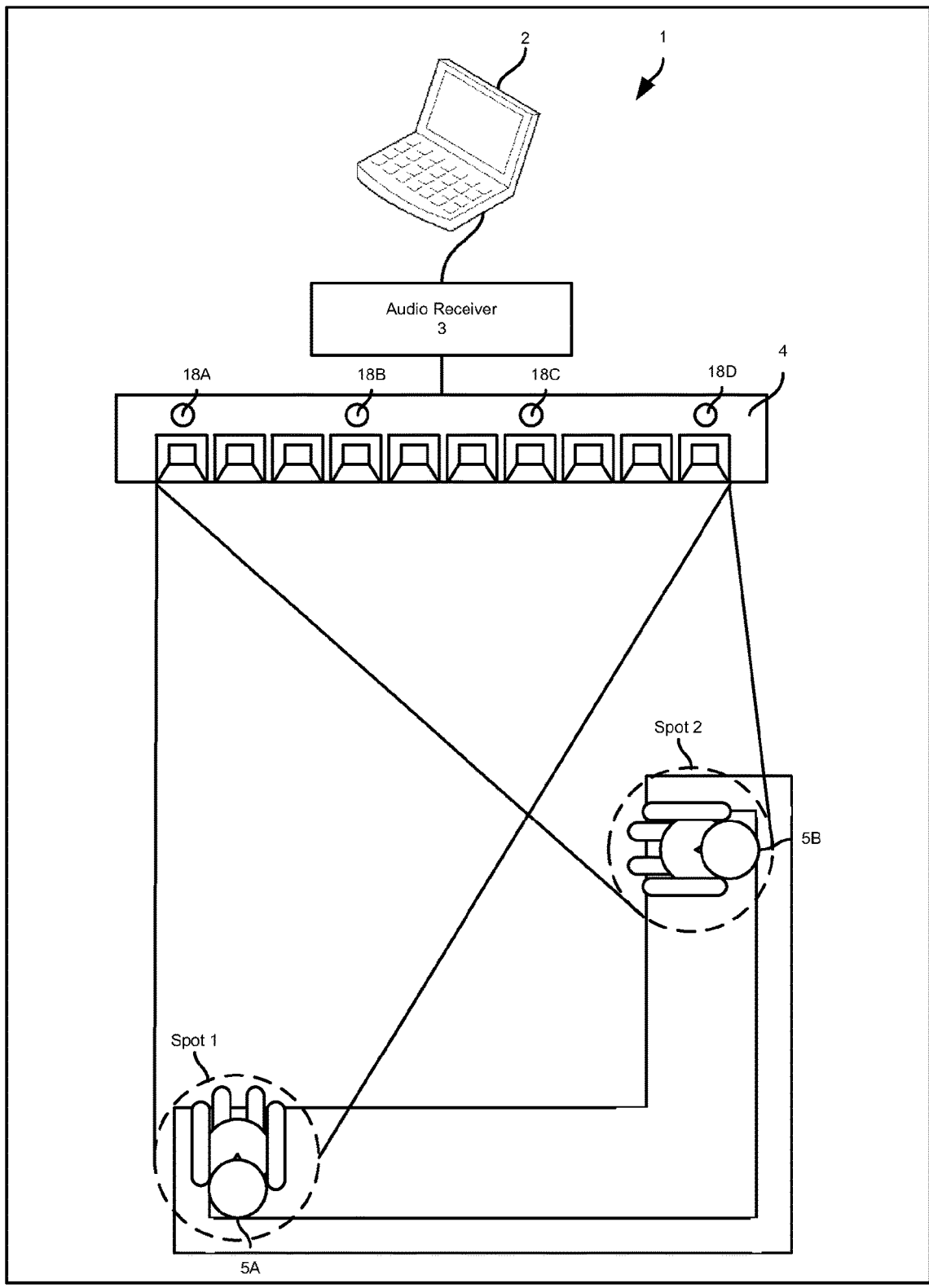
FIGS. 7A and 7B show beam patterns generated for listeners based on example voice commands.
Figure 7B:
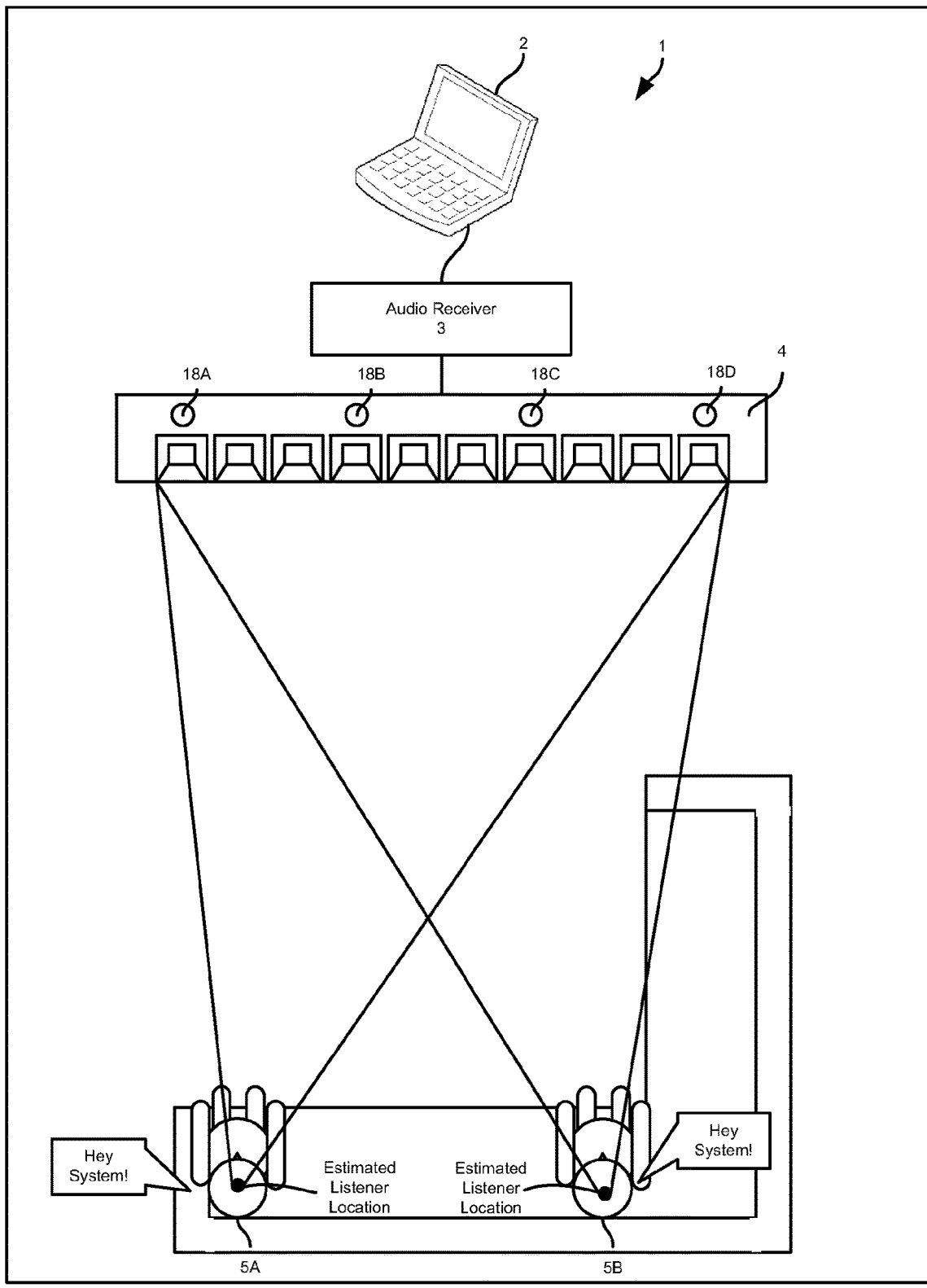

At operation 35, the method 30 applies the determined settings to generate tailored beam patterns without significant overhead and interaction by the listeners 5A and 5B. In particular, the generated beam patterns are customized to the explicit and implicit preferences of the listeners 5A and/or 5B with minimal input from the listeners 5A and 5B. FIGS. 7A and 7B show beam patterns generated for the listeners 5A and 5B based on the voice commands in FIGS. 6A and 6B, respectively. In one embodiment, the method 30 is continually performed to modify beam patterns for listeners 5 as preferences and positions of the listeners 5 change over time. In one embodiment, operation 35 updates preferences for respective user profiles stored in the user profile database 20 based on currently used settings. This adjustment ensures that listener settings are up-to-date and reflective of the current preferences of each listener 5.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for adjusting sound emitted by a loudspeaker array, comprising:
   receiving a sensed sound in a listening area having speech of a user, based on microphone signals generated by one or more microphone arrays, wherein the user is associated with a predefined location at which to direct a loudspeaker array output beam pattern;
   processing the sensed sound, to determine a location of the user in the listening area at which to steer the loudspeaker array output beam pattern; and
   if the location of the user is not determinable, then steering the loudspeaker array output beam pattern at the predefined location that is associated with the user.

2. The method of claim 1, wherein processing the sensed sound to determine the location of the user in the listening area comprises:
   determining an angle of arrival of the sensed sound based on the microphone signals of the one or more microphone arrays; and
   estimating the location of the user based on the angle of arrival of the sensed sound.

3. The method of claim 1, further comprising:
if a designated location is specified in the sensed sound, then steering the loudspeaker array output beam pattern at the designated location instead of a determined location or the predefined location of the user.

4. The method of claim 1, further comprising:
comparing the microphone signals with one or more speech signatures to identify the user.

5. The method of claim 1, wherein the predefined location associated with the user is based on historical usage habits of the user.

6. The method of claim 1, wherein the predefined location associated with the user is based on a common or preferred seating location in the listening area.

7. The method of claim 1, further comprising:
steering a second loudspeaker array output beam pattern at a second user having a second location different from the user.

8. The method of claim 1, wherein settings associated with the user are based on different content types, the different content types including music, movies, and television.

9. The method of claim 8, wherein the different content types have separate setting values, including a volume setting for each of the different content types.

10. The method of claim 1, wherein the loudspeaker array output beam pattern includes music content played back to the user.

11. An audio system for adjusting sound emitted by one or more loudspeaker arrays, comprising:
one or more microphone arrays that generate microphone signals; and
a processor, configured to
receive, through the microphone signals, a sensed sound containing speech from a user in a listening area, wherein the user is associated with a predefined location at which to direct a loudspeaker array output beam pattern;
based on the sensed sound, determine a location of the user in the listening area at which to steer the loudspeaker array output beam pattern;
steer the loudspeaker array output beam pattern at the determined location of the user in the listening area; and
if a current location of the user is not determinable, then steer the loudspeaker array output beam pattern at the predefined location that is associated with the user.

12. The audio system of claim 11, wherein the determination of the location of the user in the listening area comprises:
determining an angle of arrival of the sensed sound based on the microphone signals of the one or more microphone arrays; and
estimating the location of the user based on the angle of arrival of the sensed sound.

13. The audio system of claim 11, wherein the processor is further configured to:
if a designated location is specified in the sensed sound, steer the loudspeaker array output beam pattern at the designated location instead of the determined location or the predefined location.

14. The audio system of claim 11, wherein the processor is further configured to:
compare the microphone signals with one or more speech signatures to identify the user.

15. The audio system of claim 11, wherein the predefined location associated with the user is based on historical usage habits of the user.

16. The audio system of claim 11, wherein the predefined location associated with the user is based on a common or preferred seating location in the listening area.

17. The audio system of claim 11, wherein the processor is further configured to:
steer a second loudspeaker array output beam pattern at a second user having a second location different from the user.

18. The audio system of claim 11, wherein settings associated with the user are based on different content types, the different content types including music, movies, and television.

19. The audio system of claim 11, further comprising:
detecting a voice command based on the microphone signals, and
in response to the voice command, equalizing audio based on preset equalization settings.

20. The audio system of claim 11, wherein the audio system is a loudspeaker cabinet.

21. The method of claim 1, further comprising, if the location of the user is determined, then steering the loudspeaker array output beam pattern at the determined location of the user in the listening area.

* * * * *